United States Patent
Brink et al.

[11] Patent Number: 6,048,922
[45] Date of Patent: Apr. 11, 2000

[54] PROCESS FOR PREPARING HIGH STRENGTH FIBER REINFORCED COMPOSITES

[75] Inventors: Andrew E. Brink, Raleigh, N.C.; Jeffrey T. Owens, Kingsport, Tenn.; Alan J. Oshinski, Glenmont, N.Y.; Thomas J. Pecorini, Kingsport, Tenn.

[73] Assignee: Eastman Chemical Company, Kingsport, Tenn.

[21] Appl. No.: 09/129,546

[22] Filed: Aug. 5, 1998

Related U.S. Application Data

[60] Provisional application No. 60/056,602, Aug. 20, 1997.

[51] Int. Cl.$^7$ ............... C08J 5/10; C08K 3/40; C08L 31/00
[52] U.S. Cl. ............ 524/494; 524/492; 524/493; 524/495
[58] Field of Search ............... 524/492, 493, 524/494, 495, 496

[56] References Cited

U.S. PATENT DOCUMENTS

| | | | |
|---|---|---|---|
| 3,075,952 | 1/1963 | Conyer, Jr. et al. | 260/75 |
| 3,330,809 | 7/1967 | Perlowski | 260/75 |
| 3,379,696 | 4/1968 | Wiloth | 260/78 |
| 3,497,477 | 2/1970 | Barkey et al. | 260/75 |
| 4,064,112 | 12/1977 | Rothe et al. | 260/75 M |
| 4,161,470 | 7/1979 | Calundann | 260/47 C |
| 4,163,002 | 7/1979 | Pohl et al. | 260/40 R |
| 4,169,933 | 10/1979 | Jackson, Jr. et al. | 528/190 |
| 4,755,587 | 7/1988 | Rinehart | 528/272 |
| 4,792,573 | 12/1988 | Cohn | 521/604 |
| 4,849,497 | 7/1989 | Scannapieco | 528/272 |
| 4,876,326 | 10/1989 | Rinehart | 528/272 |
| 4,957,945 | 9/1990 | Cohn | 521/182 |
| 4,977,196 | 12/1990 | Scannapieco | 521/182 |
| 5,145,742 | 9/1992 | Yau | 428/402 |
| 5,326,793 | 7/1994 | Gallucci et al. | 523/217 |
| 5,804,626 | 9/1998 | Rogers et al. | 524/195 |

FOREIGN PATENT DOCUMENTS

| | | |
|---|---|---|
| 0 264 290 | 4/1988 | European Pat. Off. . |
| 0 410 230 | 1/1991 | European Pat. Off. . |
| 31 51 840 | 7/1983 | Germany . |
| 40 26 404 | 2/1992 | Germany . |
| 42 02 004 | 7/1993 | Germany . |
| 43 01 808 | 7/1994 | Germany . |
| WO 92/17522 | 10/1992 | WIPO . |
| WO 93 15147 | 8/1993 | WIPO . |
| WO 94/26814 | 11/1994 | WIPO . |

OTHER PUBLICATIONS

"Fiber Reinforced Poly(Ethylene Naphthalenedicarboxylate) Polymers" Research Disclosure, No. 284, Dec. 1987, p. 750/751.

*Primary Examiner*—James J. Seidleck
*Assistant Examiner*—U. K. Rajguru
*Attorney, Agent, or Firm*—Betty J. Boshears; Harry J. Gwinnell

[57] ABSTRACT

A process for preparing a high strength fiber reinforced polymer composite comprising:

A) compounding a polymer with a fiber reinforcing agent thereby forming a compounded polymer composite;

B) solid state polymerizing the compounded polymer composite to produce the high strength fiber reinforced polymer composite; and C) combining an additive into the high strength fiber reinforced polymer composite.

30 Claims, No Drawings

PROCESS FOR PREPARING HIGH STRENGTH FIBER REINFORCED COMPOSITES

CROSS REFERENCE TO RELATED APPLICATIONS

This application claims priority to U.S. provisional application Ser. No. 60/056,602, filed Aug. 20, 1997, and the 60/056,602 application is herein incorporated by this reference in its entirety.

FIELD OF THE INVENTION

The present invention relates to a process for the solid stating of a polymer composite after the polymer is compounded with a reinforcing agent, and the reinforced polymer composite prepared by this process. The process also relates to the addition of an additive after the fiber reinforced composite has been solid state polymerized. This process produces a product having good mechanical properties and also has the advantage that the additives are not subjected to the high temperatures required in the solid stating process, which would lead to degradation of many additives.

BACKGROUND OF THE INVENTION

Polymers such as polyesters, liquid crystalline polyesters, and polyamides are commonly compounded with fibers, such as glass or carbon, to produce reinforced composites. The mechanical properties of the molded composite determines the applications in which these materials are used.

The mechanical properties of a polymer composite are determined by volume averaging the individual mechanical properties of the fiber and polymer. The contribution of the fiber to the composite properties is dependent on the material that comprises the fiber as well as the final aspect ratio (length/diameter).

It is known to combine reinforcing agents, such as glass or carbon, into polymer matrices. The dependence of the fiber length on the molecular weight is also known. Processes are known to produce long fiber reinforced polymer composites; however, these processes do not utilize standard extrusion compounding technology.

PCT application WO 94/26814 discloses glass fiber reinforced polyester resin. A polyfunctional compound is added during melt-shaping. The shaped article can then be subjected to solid state polymerization.

U.S. Pat. No. 4,163,002 (Pohl et al.) discloses the solid state polymerization of a glass reinforced poly(1,4-butyleneterephthalate) or poly (1,3-propyleneterephthalate). The additives, such as stabilizers and flame retardants, are compounded into the polymer mixture prior to solid stating.

PCT application WO 92/17552 discloses increasing the solid state rate of a polyester through the addition of an upgrading additive into a polyester melt blend, granulating the blend, and then subjecting the granulate to crystallization and an upgrading reaction in the solid state.

The properties of the polymer depend on the molecular weight of the polymer as well as the polymer type. High molecular weight polyesters may be prepared by solid state polymerization, as for instance in (polyethylene terephthalate) (PET) packaging applications. Solid state polymerization may also be used to prepare liquid crystalline polyesters and nylon. Subjecting a polymer to solid state polymerization prior to compounding with a reinforcing fiber is ineffective in increasing the performance of the composite material. The higher starting molecular weight of the solid state polymerized polymer causes high shear forces during compounding of the polymer which results in a faster rate of degradation and thus greater loss in molecular weight. The higher molecular weight polymer results in a higher melt viscosity which leads to more fiber breakage, leading to inferior properties. The loss in molecular weight and the increased fiber breakage both lead to inferior properties.

Solid state polymerization is a well-known technique for building up the molecular weight of a polymer in the solid state. One conventional solid stating operation takes place in a plug flow reactor in which polymer pellets are introduced into the top of a tall cylindrical vessel and removed from the bottom at the same rate. During the residence time in the reactor, which is commonly on the order of 4–18 hours, the pellets reach high temperatures, generally in the range of 200–250 C. The particular temperature is dependent on the polymer being used. Solid state polymerization is disclosed in U.S. Pat. No. 4,064,112, which is incorporated in its entirety herein by this reference.

Many additives that are often useful in fiber reinforced composites are not compatible with the high temperatures over a period of time that are required for solid stating. There exists a need for compositions and methods that provide excellent properties obtained during solid state polymerization, while avoiding the degradation of additives during the solid state processing of the polymers.

SUMMARY OF THE INVENTION

The present invention solves these problems, and provides further surprising properties. These and further objects of the invention will be more readily appreciated when considering the following disclosure and appended claims.

The present invention concerns a process for preparing a high strength fiber reinforced polymer composite containing at least one additive comprising:

A) compounding a polymer with a fiber reinforcing agent thereby forming a compounded polymer composite;

B) solid state polymerizing the compounded polymer composite to produce the high strength fiber reinforced polymer composite; and thereafter C) combining an additive into the high strength fiber reinforced polymer composite.

The invention also concerns compositions produced by the methods of the invention and articles made from the compositions.

DETAILED DESCRIPTION OF THE INVENTION

The present invention may be understood more readily by reference to the following detailed description of preferred embodiments of the invention and the Examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

The singular forms "a," "an" and "the" include plural referents unless the context clearly dictates otherwise. "Optional" or "optionally" means that the subsequently described event or circumstances may or may not occur, and that the description included instances where said event or circumstance occurs and instances where it does not.

Throughout this application, where publications are referenced, the disclosures of these publications in their entireties are hereby incorporated by reference into this application in order to more fully describe the state of the art to which this invention pertains.

The present invention concerns a process for preparing a high strength fiber reinforced polymer composite containing at least one additive comprising:

A) compounding a polymer with a fiber reinforcing agent thereby forming a compounded polymer composite;

B) solid state polymerizing the compounded polymer composite to produce the high strength fiber reinforced polymer composite; and thereafter C) combining an additive into the high strength fiber reinforced polymer composite.

The invention further concerns compositions produced according to the above methods and to articles formed from those compositions.

Solid stating compounded pellets of fiber reinforced composites prior to further processing, such as injection molding, provides the finished products, such as molded products, with better mechanical properties than (1) non-solid stated polymers as well as (2) polymers that are solid stated before compounding with fiber. Solid stating the fiber reinforced compounded polymer provides an increase in the solid state rate of the polymer as compared to the solid state rate with unreinforced polymers. The lower melt viscosity of the starting resin provides longer fiber lengths in the compounded polymer and the molded part produced from this polymer. The lower melt viscosity may be obtained by starting with a lower molecular weight material or by using a higher compounding temperature. This would normally result in a fiber reinforced composite with a molecular weight that is too low to provide good mechanical properties. By solid stating after compounding with a fiber, the molecular weights can be increased to acceptable levels.

Additives are often introduced into a polymer formulation to provide a wide variety of desirable properties including additives such as melt stabilizers, antioxidants, flame retardants, processing aids, plasticizers, coloring agents and nucleating agents. These additives may volatize or degrade in solid stating conditions because of the extended times at elevated temperatures. The consequences of this degradation include rendering the additives ineffective and/or causing adverse reactions with the polymer.

Applicants have discovered that a superior high strength fiber reinforced polymer composite having at least one additive may be formed by compounding a polymer with a fiber reinforcing agent, followed by solid stating the compounded polymer composite and thereafter combining an additive into the high strength fiber reinforced polymer composite. Applicants have also discovered that the addition of additives either prior to or during subsequent processing, i.e. after solid state polymerization, avoids degradation of the additives. In a preferred embodiment, the additives are added in a "salt and pepper" blend in which pellet blends are used, rather than an additional melt mixing step, to incorporate the additives into the polymer composite. This mixture can then be utilized to produce an article in a subsequent processing step. In another preferred embodiment, the additives can be incorporated with the polymer in the subsequent processing steps. These processing steps include, though are not limited to, injection molding or extrusion. The additives are therefore not subjected to the high temperatures for long periods of time that are required in the solid stating process.

Polymers which are useful in the present invention include those which are semicrystalline and may be upgraded in a solid phase reaction. These polymers include, but are not limited to, polyesters, liquid crystalline polymers, and polyamides.

The term "polyester," as used herein, refers to any unit-type of polyester falling within the scope of the polyester portion of the blend, including, but not limited to, homopolyesters, copolyesters (two or more types of acid or glycol residues of monomeric units) and terpolyesters. The polyesters of the present invention comprise one or more acid residues and one or more glycol residues. The acid residues of the polyesters of the present invention total 100 mol % and the glycol residues of the polyesters of the present invention total 100 mol %.

The acid residues of the polyesters may be derived from components including, but not limited to, dibasic acids, the corresponding esters of dibasic acids, mixtures of dibasic acids and their corresponding esters, lower alkyl esters, acid chlorides or anhydrides. It is preferred that the acid residues of the polyesters contain at least 50 mol % of at least one dibasic acid from the groups terephthalic, isophthalic, naphthalenedicarboxylic and cyclohexanedicarboxylic acids. In addition, the acid residues of the polyesters may be made up of up to 50 mole % of other modifying dibasic acids which contain 4 to about 40 carbon atoms, including, but not limited to, succinic, glutaric, adipic, sebacic, dimer acids and the like. Cis-, trans- or cis/trans mixtures of cyclohexanedicarboxylic acid may be used. Any naphthalenedicarboxylic acid isomers may be used; however, the preferred isomers are the 2,6-, 2,7-, 1,4- and 1,5-isomers.

The glycol residue of the polyesters may be derived from glycols, including, but not limited to, ethylene glycol; propylene glycol; 1,3-propanediol; 1,4-butanediol; 1,6-hexanediol; 1,8 octanediol; 1,10-decanediol; 2,2-dimethyl-1,3-propanediol; 1,4-cyclohexanedimethanol; diethylene glycol; polyethylene glycol; polypropylene glycol; polytetramethylene glycol; and mixtures thereof. It is preferred that the glycol residues of the polyesters contain at least 50 mole % of ethylene glycol; 1,3-propanediol; 1,4 butanediol; or 1,4-cyclohexanedimethanol. The 1,4-cyclohexanedimethanol may be in cis-, trans- or mixture of cis/trans.

The polyesters which may be used in the practice of this invention include, but are not limited to polyesters based on the following dicarboxylic acids: terephthalic, isophthalic, naphthalenedicarboxylic and cyclocohexanedicarboxylic acid and which contain one or more glycols having 2 to about 10 carbon atoms. Useful polyesters include, but are not limited to, polybutylene terephthalate (PBT), polypropylene terephthalate (PPT), polyethylene terephthalate (PET), polyethylene naphthalate (PEN) and polycyclohexanedimethylene terephthalate (PCT).

In addition, the polyester may optionally contain small amounts of branching agents including, but not limited to, trimellitic acid, trimellitic anhydride, pyromellitic dianhydride, glycerol, trimethylolpropane, pentaerythritol or similar compounds. It is preferred that the polyesters have an inherent viscosity (I.V.) of from about 0.2 to about 1.0 prior to compounding with the reinforced fiber, as measured in a 60/40 phenol/tetrachlorethane solvent mixture. The polyesters should have sufficient crystallinity to prevent sticking during the solid stating process.

The liquid crystalline polyesters and copolyesters which may be used in the instant invention include, but are not limited to, those based on monomeric residues of p-hydroxybenzoic acid, 6-hydroxy-2-naphthoic acid, p-acyloxybenzoic acid, cyclohexanedicarboxylic acid, hydroquinone, 2-6-naphthalenedicarboxylic acid, terephthalic acid, isophthalic acid, and mixtures thereof. Typical liquid crystalline polyesters which may be used in the instant invention are disclosed in U.S. Pat. No. 4,169,933 and U.S. Pat. No. 4,161,470, which are incorporated herein by this reference.

The polyamides that may be used in the instant invention include, but are not limited to, those based on the self condensation of amino carboxylic acids and their corresponding lactams, dicarboxylic acids and diamines and salts of dicarboxylic acids and diamines. The dicarboxylic acid component of the polyamide can be prepared from dicarboxylic acids, their corresponding esters, or mixtures thereof.

The amino carboxylic acids and lactams which are useful in the instant invention include, but are not limited to, one or more aminocarboxylic acids having from 2 to 16 carbon atoms between the amino group and carboxylic acid groups, and one or more of the corresponding lactams having 2 to 16 carbon atoms the carbon atoms of the lactams forming a ring, or lactam with the —CO—NH— groups. Aminocarboxylic acids and lactams which may be used include, but are not limited to, -aminocaproic acid, 3- and 4-aminobenzoic acids, butyrolactam, pivalactam, caprolactam, capyryllactam, enantholactam, undecolactam, dodecanolactam and mixtures thereof. Preferred are— aminocaproic acid, caprolactam, undecolactam and dodecanolactam; more preferably caprolactam.

Dicarboxylic acids which may be used in the production of the polyamides useful in the invention include, but are not limited to, aliphatic diacids and aromatic diacids, and mixtures of aliphatic and aromatic diacids. Suitable diacids include, but are not limited to terephthalic acid and isophthalic acid. Aliphatic acids useful in the invention have the general formula:

HOOC—Y—COOH where Y represents a divalent aliphatic radical having at least 2 carbon atoms. The aliphatic acids include, but are not limited to, sebacic acid, octadecanedioic acid, suberic acid, azelaic acid, undecanedioic acid, glutaric acid, pimelic acid, adipic acid and mixtures thereof. The dicarboxylic acids may be used in the form of a functional derivative, including but not limited to the corresponding ester. Preferred dicarboxylic acids are succinic acid, adipic acid, azelaic acid, suberic acid and sebacic acids; more preferably adipic acid.

Diamines that may be used in the production of the polyamides useful in the invention include diamines of the formula $H_2N(CH_2)_nNH_2$ where n is an integer from 2 to 16. These diamines include, but are not limited to, ethylenediamine, trimethylenediamine, tetramethylenediamine, pentamethylenediamine, hexamethylenediamine, 1,4-cyclohexanedimethylamine and mixtures thereof. Preferred diamines include tetramethylenediamine and hexamethylenediamine; more preferably hexamethylenediamine. Useful polyamides include, but are not limited to nylon 6, nylon 6,6, nylon 4,6 and polyphthalamides.

Suitable fibers include, but are not limited to glass, carbon, aramids and other reinforcing fibers. Specific examples include, but are not limited to, E Glass, S Glass, A Glass and KEVLAR fiber, an aramid fiber, manufactured by E.I. du Pont de Nemours, of Wilmington, Del., USA.

In addition to the polymer components disclosed above, the composite contains an additive or additives frequently used in polymers including colorants, fillers, processing aids, plasticizers, nucleating compounds, stabilizers, antioxidants, mold release agents, flame retardants, stabilizers, inert reinforcing agents, and the like or mixtures thereof. Inert reinforcing agents include, but are not limited to calcium carbonate, talc, iron oxide, mica, montmorillonite, clay and the like.

Melt stabilizers, antioxidants, flame retardants, processing aids, plasticizers, coloring agents and nucleating agents may not be compatible with the long time periods and high temperature required for solid stating. In the instant invention, the additives are combined after solid state polymerization and may be added prior to or during a step, including, but not limited to injection molding, extrusion and compression molding. The additives may be combined in either a neat form or a precompounded concentrate having the same polymer base as the fiber reinforced resin, or a polymer base compatible with the fiber reinforced resin.

The reinforcing fiber may be melt mixed with the polymer to form fiber reinforced pellets. The level of reinforcement is typically from 10% to 65% by weight of the final composite, with a level of reinforcement from 15–45% by weight of the final composite being more preferred. A wide range of appropriate mixing procedures may be used, including, but not limited to, the use of Brabender Plastographs, melt mixing in a Haake Plastograph, single screw extrusion, and twin screw extrusion. The blends are readily melt processed and extruded as pellets or chips. The fiber reinforced pellets are then solid state polymerized.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in C or is at room temperature and pressure is at or near atmospheric.

Examples 1–7

The following examples were prepared using poly(1,4-cyclohexanedimethylene terephthalate) (PCT) having a starting inherent viscosity in the range of 0.65 to 0.75 as determined at 25 C using 0.5 grams of polymer per 100 ml of a solvent composed of 60 wt % phenol and 40 wt % tetrachloroethane. The PCT and glass blends were prepared by mixing in a twin screw extruder with a set point of 300 C, except examples 5 and 6 which were compounded at 350 C. The examples were extruded into a bath and pelletized. All compositions are reported on a weight % basis. All formulations contain 7 wt % additives, which consist of antioxidants, stabilizers, and processing aids. In examples 1, 2 and 7 the additives were compounded into the PCT with the glass. In examples 3, 4, 5 and 6 the additives were added subsequent to compounding in an injection molding step. The conditions for solid stating were 8 hours at 245 C under an inert gas flow. Examples 1, 4 and 6 were not solid stated. Example 2 was solid stated prior to compounding with glass, and examples 3, 5 and 7 were solid stated after the compounding step of the process, but prior to injection molding. Melt viscosity was measured on a Gottfert rheometer at the specified frequency and temperature. Mechanical properties were evaluated on injection molded specimens following ASTM methods. The results are set forth in Table 1 below.

Example 1 (comparative) is a 30% glass fiber reinforced PCT produced by the standard production process known in the art. The final composite has a tensile strength of 103.3 MPa and a molecular weight of 10,330 g/mole.

Example 2 (comparative) is a 30% glass fiber reinforced PCT produced by first solid stating the PCT, as is common in the art, followed by the standard compounding, injection molding process. Although the PCT was solid stated to a $M_n$ of 15,051 g/mole, the molecular weight in the final molded specimen was only 10,545 g/mole. This molecular weight is essentially identical to that in Example 1, which teaches that solid stating prior to compounding is an ineffective means of producing a higher molecular weight molded part. The mechanical properties are essentially identical to Example 1.

Example 3 was produced by first compounding PCT and glass with no additives. This blend was then solid stated to a molecular weight of 15,306 g/mole and then dry mixed with an additive concentrate followed by injection molding. The final molecular weight of this example was 11,171 g/mole or 1,000 g/mole higher than examples 1 and 2. This procedure also produced a molded part with superior strength properties. For comparison, example 3 had a tensile strength of 126 MPa, while example 1 had a tensile strength of 103 MPa.

Example 4 (comparative) was prepared in the same manner as example 3; however, it was not solid stated. This example has a lower molecular weight and inferior strength properties compared to example 3. This shows the distinct advantage of solid stating after compounding.

Example 5 was prepared in the same manner as Example 3, however, it was compounded at 350 C instead of 300 C. The higher compounding temperature reduced the molecular weight of the compounded PCT to only 6,264 g/mole. Solid stating was then used to increase this molecular weight to 8,344 g/mole in the molded part. The higher temperature also produced a lower melt viscosity during compounding and therefore the fiber length produced was longer than examples compounded at 300 C. The longer fiber length provided an increase in tensile strength (113.7 MPa) compared to Example 4 (102.6 MPa), which had essentially the same molecular weight. This shows another advantage to the claimed process.

Example 6 (comparative) was prepared in the same manner as example 5, however, it was not solid stated. This example has a low molecular weight, and inferior strength properties compared with example 5.

Example 7 (comparative) was prepared by mixing all additives and glass with PCT during the compounding step of the process. This compounded formulation was then solid stated prior to injection molding. Many of the additives commonly used in injection moldable glass fiber reinforced composites are temperature sensitive. The addition of these additives prior to solid stating is shown to be detrimental by comparing this example with example 3. Example 7 has a lower molecular weight and poorer strength properties.

TABLE 1

| Mechanical Properties of 30% Glass Reinforced PCT | | | | | | | |
|---|---|---|---|---|---|---|---|
| Example #: | 1 | 2 | 3 | 4 | 5 | 6 | 7 |
| Base Polymer | PCT | PCT | PCT | PCT | PCT | PCT | PCT |
| Polymer % | 63 | 63 | 63 | 63 | 63 | 63 | 63 |
| Glass % | 30 | 30 | 30 | 30 | 30 | 30 | 30 |
| Additives % | 7* | 7* | 7** | 7** | 7** | 7** | 7* |
| Mn Prior to Compounding (g/mole) | 11750 | 15051 | 11750 | 11750 | 11750 | 11750 | 11750 |
| Mn Prior to Molding (g/mole) | 10732 | 10158 | 15306 | 8039 | 10601 | 6264 | |
| Solid Stated Prior to Compounding | No | Yes | No | No | No | No | No |
| Solid Stated After Compounding | No | No | Yes | No | Yes | No | Yes |

TABLE 1-continued

Mechanical Properties of 30% Glass Reinforced PCT

| Compounding Temperature (° C.) | 300 | 300 | 300 | 300 | 350 | 350 | 300 |
|---|---|---|---|---|---|---|---|
| AS MOLDED PROPERTIES | 1 | 2 | 3 | 4 | 5 | 6 | 7 |
| Ash (wt %) | 29.6 | 31.0 | 31.2 | 33.1 | 31.7 | 30.3 | 31.4 |
| Density after molding (g/cm$^3$) | 1.437 | 1.459 | 1.473 | 1.457 | 1.464 | 1.458 | 1.466 |
| HDT @ 264 psi (1.8 MPa) in ° C. | 259 | 257 | 257 | 260 | 260 | 263 | |
| Strength, Tensile (MPa) | 103.3 | 104.0 | 126.0 | 102.6 | 113.7 | 80.1 | 95.1 |
| Tensile Elongation w/Ext. (%) | 1.9 | 1.9 | 1.8 | 1.7 | 1.6 | 1.3 | 1.4 |
| Modulus, Tensile (MPa) | 8161 | 8232 | 9651 | 8613 | 9264 | 8440 | 8407 |
| Strength, Flexural (MPa) | 154.6 | 156.4 | 185.6 | 152.5 | 162.0 | 123.6 | 147.3 |
| Flexural Elongation (%) | 2.4 | 2.5 | 3.1 | 2.2 | 2.3 | 1.7 | 2.1 |
| Modulus, Flexural (MPa) | 7629 | 7837 | 7367 | 8047 | 8261 | 7867 | 7867 |
| Notched IZOD @ 23° C. (J/m) | 67.2 | 68.2 | 87.9 | 74.9 | 95.1 | 89.7 | 77.5 |
| Unnotched IZOD @ 23° C. (J/m) | 487.7 | 562.8 | 649.9 | 442.3 | 500.8 | 279.4 | 520.9 |
| Mn of Molded Bar (g/mole) | 10330 | 10545 | 11171 | 8232 | 8344 | 5829 | 5686 |
| Fiber Length (LWM of Bar) in μm | 403 | 423 | 413 | 424 | 504 | 503 | 374.1 |

*- additives incorporated during compounding
**- additives incorporated after compounding

Examples 8–11

Examples 8–11: Examples 8–11 examined the effect of various glass fiber reinforcements on the solid state rate of polyesters. For these examples, the polyester PCT was utilized and the glass fibers were obtained from commercial sources. Example 8 is the control polyester with no glass fiber while samples 9–11 contain 30 weight % glass fiber. The PCT and glass blends were prepared by mixing on a twin screw extruder with a set point of 300° C. The examples were extruded into a water bath and pelletized. Solid stating conditions were 8 hours at 245° C. under an inert gas flow. The solid state rate is reported in terms of molecular weight increase per hour of solid stating. The control, example 8, has a solid stating rate, based on number average molecular weights (Mn), of 126 g/mole per hour. As can be seen in Table 2, shown below, the glass fiber containing examples (9, 10 and 11) all have higher solid stating rates.

TABLE 2

Solid State Rates of Glass Fiber Reinforced Polyester

| Example # | 8 | 9 | 10 | 11 |
|---|---|---|---|---|
| Glass Type | None | OC 183F | OC 473A | 0C405D |
| Mn @ 0 Hours | 12660 | 11570 | 11710 | 11310 |
| Mw @ 0 Hours | 24850 | 22260 | 22420 | 21610 |
| Mn @ 4 Hours | 14310 | 15370 | 17180 | 14750 |
| Mw @ 4 Hours | 28690 | 40670 | 36330 | 31030 |
| Mn @ 8 Hours | 13670 | 18590 | 17610 | 15240 |
| Mw @ 8 Hours | 30160 | 51620 | 38120 | 31980 |
| Solid State Rate (Mn/hr) | 126 | 877 | 738 | 491 |
| Solid State Rate (Mw/hr) | 664 | 3670 | 1963 | 1296 |

The invention has been described in detail with particular reference to preferred embodiments thereof, but it will be understood that variations and modifications can be effected within the spirit and scope of the invention.

What is claimed is:

1. A process for preparing a high strength fiber reinforced polymer composite having at least one additive comprising:

A) compounding a polymer with a fiber reinforcing agent thereby forming a compounded polymer composite;
   B) solid state polymerizing the compounded polymer composite to produce the high strength fiber reinforced polymer composite; and thereafter
   C) combining an additive into the high strength fiber reinforced polymer composite.

2. The process of claim 1, wherein the fiber reinforcing agent is glass fiber.

3. The process of claim 1, wherein the fiber reinforcing agent is carbon fiber.

4. The process of claim 1, wherein the additive is selected from the group consisting of a colorant, a filler, a processing aid, a plasticizer, a nucleating compound, a stabilizer, an antioxidant, a mold release agent, a flame retardant, a stabilizer, an inert reinforcing agent and a mixture thereof.

5. The process of claim 1, wherein the process further comprises the step of injection molding the fiber reinforced polymer composite and wherein the additive is combined prior to or during injection molding.

6. The process of claim 1, wherein the process further comprises the step of extruding the fiber reinforced polymer composite and wherein the additive is combined prior to or during extrusion.

7. The process of claim 1, wherein the polymer comprises a polyester comprising an acid residue and a glycol residue.

8. The process of claim 7, wherein the polyester is selected from the group consisting of polybutylene terephthalate, polypropylene terephthalate, polyethylene terephthalate, polyethylene naphthalate and polycyclohexanedimethylene terephthalate.

9. The process of claim 7, wherein the acid residue of the polyester is selected from the group consisting of the residue of terephthalic acid, isophthalic acid, naphthalenedicarboxylic acid and cyclohexanedicarboxylic acid and a mixture thereof.

10. The process of claim 7, wherein the acid residue of the polyester is derived from components selected from the group consisting of a dibasic acid, a lower alkyl ester, an acid chloride, and an anhydride.

11. The process of claim 7, wherein the acid residue of the polyester comprises the residue of naphthalenedicarboxylic acid, wherein the residue of naphthalenedicarboxylic acid comprises isomers selected from the group consisting of 2,6-, 2,7-, 1,4- 1,5- and a mixture thereof.

12. The process of claim 10, wherein the polyester comprises at least 50 mol % of dibasic acid residues having 4 to 40 carbon atoms, wherein the acid residues total 100 mol % and the glycol residues total 100 mole %.

13. The process of claim 7, wherein the glycol residue is selected from the group consisting of a residue of ethylene glycol, propylene glycol, 1,3-propanediol, 1,4-butanediol, 1,6-hexanediol, 1,8-octanediol, 1,10-decanediol, 2,2-dimethyl-1,3-propanediol, 1,4-cyclohexanedimethanol, diethylene glycol, polyethylene glycol, polypropylene glycol, polytetramethyleneglycol and a mixture thereof.

14. The process of claim 7, wherein the polyester comprises at least 50 mole % of glycol residues selected from the group consisting of a residue of ethylene glycol, 1,3-propanediol, 1,4 butane-diol 1,4-cyclohexanedimethanol and a mixture thereof and wherein the acid residues total 100 mol % and the glycol residues total 100 mole %.

15. The process of claim 7, wherein the polyester has an inherent viscosity of 0.2 to 1.0 prior to compounding, and wherein the polyester is crystalline.

16. The process of claim 1, wherein the polymer comprises a liquid crystalline polyester comprising an acid residue and a glycol residue.

17. The process of claim 16, wherein the acid residue of the liquid crystalline polyester comprises a residue selected from the group consisting of p-hydroxybenzoic acid, 6-hydroxy-2-naphthoic acid, p-acyloxybenzoic acid, 2,6 naphthalenedicarboxylic acid, terephthalic acid, isophthalic acid, cyclohexanedicarboxylic acid and a mixture thereof.

18. The process of claim 16, wherein the glycol residue of the liquid crystalline polyester comprises a residue of hydroquinone.

19. The process of claim 1, wherein the polymer comprises a polyamide.

20. The process of claim 19, wherein the polyamide comprises a condensation product of a compound containing from 2 to 16 carbon atoms between the amino residue and the carboxylic acid residue.

21. The process of claim 19, wherein the polyamide comprises a self-condensation product of an aminocarboxylic acid.

22. The process of claim 19, wherein the polyamide comprises a condensation product of a salt of a dicarboxylic acid and a diamine.

23. The process of claim 19, wherein the polyamide comprises a condensation product of a lactam.

24. The process of claim 23, wherein the lactam is selected from the group consisting of butyrolactam, pivalactam, caprolactam, capyryllactam, enantholactam, undecolactam, dodecanolactam and a mixture thereof.

25. The process of claim 19, wherein the polyamide comprises a condensation product of a dicarboxylic acid and a diamine.

26. The process of claim 25, wherein the dicarboxylic acid is aliphatic, aromatic or a mixture of aliphatic and aromatic dicarboxylic acids.

27. The process of claim 25, wherein the dicarboxylic acid is an aliphatic acid having the formula:

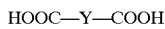

HOOC—Y—COOH where Y is a divalent radical containing at least 2 carbon atoms.

28. The process of claim 25, wherein the diamine has the formula:

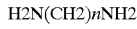

H2N(CH2)$n$NH2 wherein n is an integer from 2 to 16.

29. A high strength fiber reinforced polymer composite prepared by the process of claim 1.

30. An article comprising the composite of claim 29.

* * * * *